(No Model.)
J. H. F. GÖRGES.
MEANS FOR INDICATING COINCIDENCE OF PHASE OF TWO ALTERNATING OR POLYPHASE CURRENT MACHINES.
No. 545,282. Patented Aug. 27, 1895.
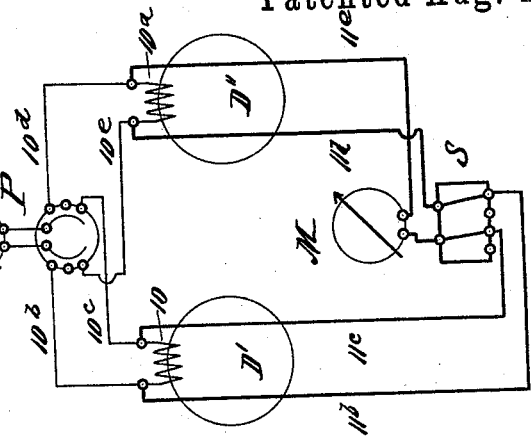
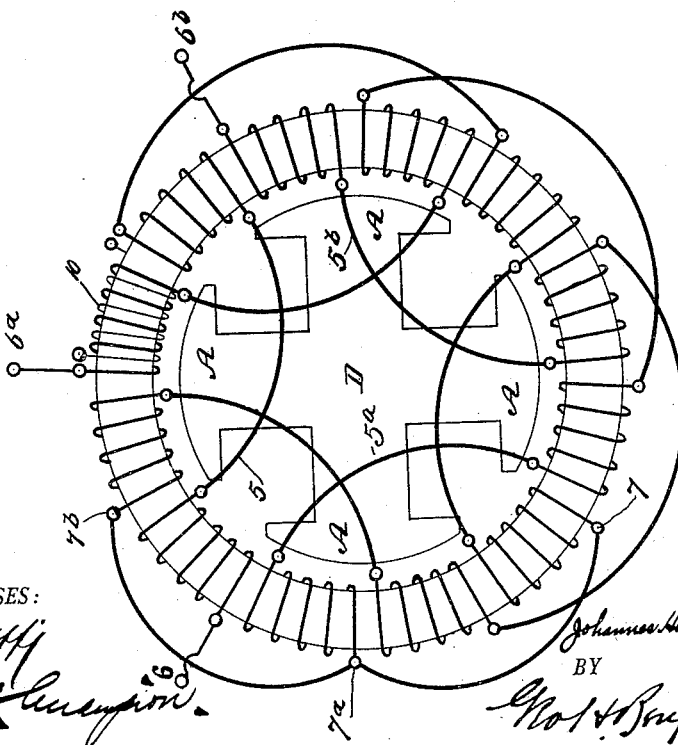
WITNESSES:
INVENTOR
Johannes Heinrich Friedrich Görges
BY
ATTORNEY

UNITED STATES PATENT OFFICE.

JOHANNES HEINRICH FRIEDRICH GÖRGES, OF BERLIN, GERMANY, ASSIGNOR, BY MESNE ASSIGNMENTS, TO THE SIEMENS & HALSKE ELECTRIC COMPANY OF AMERICA, OF CHICAGO, ILLINOIS.

MEANS FOR INDICATING COINCIDENCE OF PHASE OF TWO ALTERNATING OR POLYPHASE CURRENT MACHINES.

SPECIFICATION forming part of Letters Patent No. 545,282, dated August 27, 1895.

Application filed April 4, 1894. Serial No. 506,257. (No model.)

*To all whom it may concern:*

Be it known that I, JOHANNES HEINRICH FRIEDRICH GÖRGES, a subject of the Emperor of Germany, residing at Berlin, Germany, have invented new and useful Improvements in Means for Indicating Coincidence of Phase of Two Alternating or Polyphase Current Machines, of which the following is a specification.

If several alternating or polyphase current machines are to be coupled in parallel, the current at the terminals of the respective machines must correspond in potential, number of periods, and phase.

To determine when such machines do so correspond is the object of my invention. The potential of the current generated by the respective machines to be coupled can readily be determined by locating upon the armature of each machine, at any desirable but similarly-located point, an auxiliary coil entirely unconnected with the main coils of the machine. The number of periods of the current will depend upon the construction and speed of operation of the machine, and the correspondence in phase of the current of the respective machines may be indicated by causing two currents corresponding in potential and number of periods to pass in opposite directions through a suitable current-indicating device, which, when the currents are in phase—that is, differ in phase by one hundred and eighty degrees—will indicate such fact by the needle of the device coming to rest, at which moment the machines to be coupled correspond in potential, number of periods, and phase, and their parallel coupling may be effected in any suitable manner, as by means of a properly-arranged switch.

The accompanying diagrams serve to illustrate my invention, in which—

Figure 1 shows a four-pole polyphase machine provided with three interrelated circuits and an auxiliary coil on the armature; Fig. 2, two such machines connected through suitable switches with potential and current indicating apparatus.

Referring first to Fig. 1, D indicates a polyphase-current generator provided with three main armature-coils 5 $5^a$ $5^b$. 6 $6^a$ $6^b$ are the external terminals of the coils, and 7 $7^a$ $7^b$ the connected ends whereby there are formed, as is usual in machines of this type, three interrelated circuits on the armature. In this diagram the field-magnets are indicated at A; but the usual coils are omitted in the drawings for the purpose of clearness. Located on the armature of the machine is an auxiliary coil 10. This coil in all the machines to be coupled in parallel should have a defined location. The particular location of the coil on the armature is unimportant, but must be the same in all the machines to be coupled, as by so doing the phase relations of the several machines to be coupled may be determined. Preferably the auxiliary coil should be calculated to give a current of lower potential than that at the terminals of the main coils of the machine, as such current of lower potential is more readily handled through potential-indicating apparatus. It will be understood that the potential of the auxiliary coil is proportional to the potential of the main coils.

Referring now to Fig. 2, two machines D' D'' are indicated, each provided with an auxiliary coil 10 $10^a$, connected, respectively, through the conductors $10^b$ $10^c$ $10^d$ $10^e$ with the plug-switch P and potential-indicator V, and also respectively connected through conductors $11^b$ $11^c$ $11^d$ $11^e$ to the two-pole switch S and current-meter M. The meter may be of any suitable type, and have its scale so arranged that it directly indicates the phasial conditions when the potential of both machines is the same.

The principle embodied in my invention will be readily comprehended by those skilled in the art to which my invention relates.

To determine the potential of the machines the current from first one and then the other auxiliary winding is caused to flow through the potential-indicator V. When the potentials are found to be alike, the coils are cut out of the circuit with the volt-meter and put into circuit through the current-meter, the currents flowing in opposite directions. If the currents correspond in potential, number of periods, and phase, (difference in phase one hundred and eighty degrees,) they will compensate each other in the current-indicator, and the needle of the indicator will occupy a practically-constant position or only move very slowly. If the two currents differ in phase, the needle will move with more or less speed, depending upon the phasial differences at the moment, as will be understood from the foregoing. The two machines are thus first brought to the same potential, the indicator V being thrown into circuit first with one and then with the other of the machines to determine the potentials. When the potentials are the same, the two machines are thrown in opposition through the current-indicator M, and as the potentials are the same it will be understood that any fluctuation of the needle of indicator M will arise from difference of period or phase. If the period be different, the needle will gradually oscillate, due to the zero or nodal points, when the two currents fall to zero at the same point. When the speed has increased to bring the two currents to the same period, the oscillation of the needle will cease, as any difference of phase between the two currents will cause the needle to assume a definite position, due to the average current flowing. The machine may now be thrown together in circuit and, being in parallel, will immediately fall into step.

I wish it understood that I do not limit myself to any particular type of alternating or multiphase current machines with which my invention may be used, as it is applicable to all types. Neither do I limit myself to its employment with generating apparatus, as it may be likewise used for coupling motors in parallel. I wish it further understood that I do not limit myself to the particular apparatus shown and described, as many changes may be made therein without in anywise departing from the intent of my invention.

Having thus described my invention, I claim—

1. The combination with two alternating or multiphase machines, each provided with a similarly located auxiliary coil, of an indicator for indicating when the separate currents generated by said auxiliary coils correspond in potential; substantially as described.

2. The combination with two alternating or multiphase machines, each provided with a similarly located auxiliary coil, of a differential indicator for indicating when the separate currents generated by said auxiliary coils correspond in number of periods; substantially as described.

3. The combination with two alternating or multiphase machines, each provided with a similarly located auxiliary coil, of an indicator for indicating when the separate currents generated by said auxiliary coils correspond in potential, and a differential indicator for indicating when the said currents correspond in number of periods; substantially as described.

4. The combination with two alternating or multiphase current machines, each provided with a similarly located auxiliary coil; of a potential indicator; a switch by means of which the current generated in each coil may be separately caused to pass through the potential indicator; a current indicator; and a switch by means of which the currents from the two coils may be caused to pass in opposite directions through the current indicator.

5. A means to indicate the synchronism and displacement in phase of the magnetism of alternating or polyphase current machines to be coupled in parallel, comprising a similarly located auxiliary coil on the armature of each machine, independent of and separate from the main coils of said machines; and a current indicator provided with a direct reading scale and needle adapted, when the two currents are transmitted through it in opposite directions, to show the condition of both machines.

6. The combination with two alternating or multiphase current machines, each provided with an auxiliary coil; of a potential indicator; a switch and interposed connections between said coils and switch; a direct reading current indicator; a second switch and interposed connections between said coils and said second switch.

In testimony whereof I affix my signature in the presence of two witnesses.

JOHANNES HEINRICH FRIEDRICH GÖRGES.

Witnesses:
OSCAR BIELEFELD,
JOHN B. JACKSON.